Jan. 2, 1968   W. B. DOBBS   3,361,465
HAND HOLE COVER DEVICE
Filed Feb. 18, 1966   2 Sheets-Sheet 1
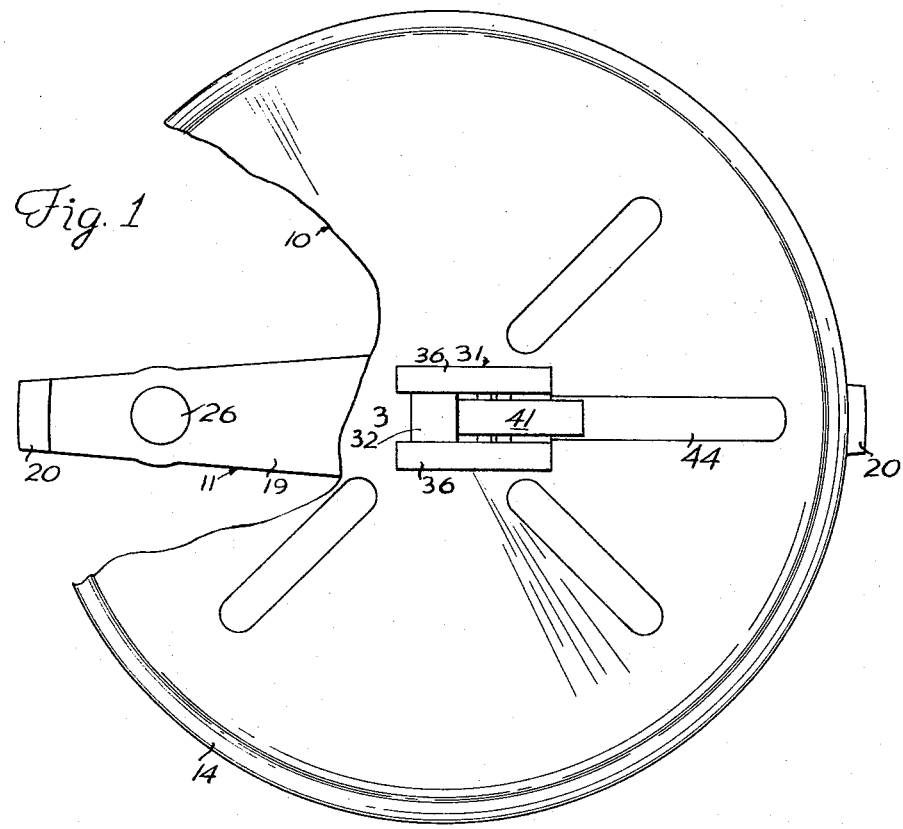
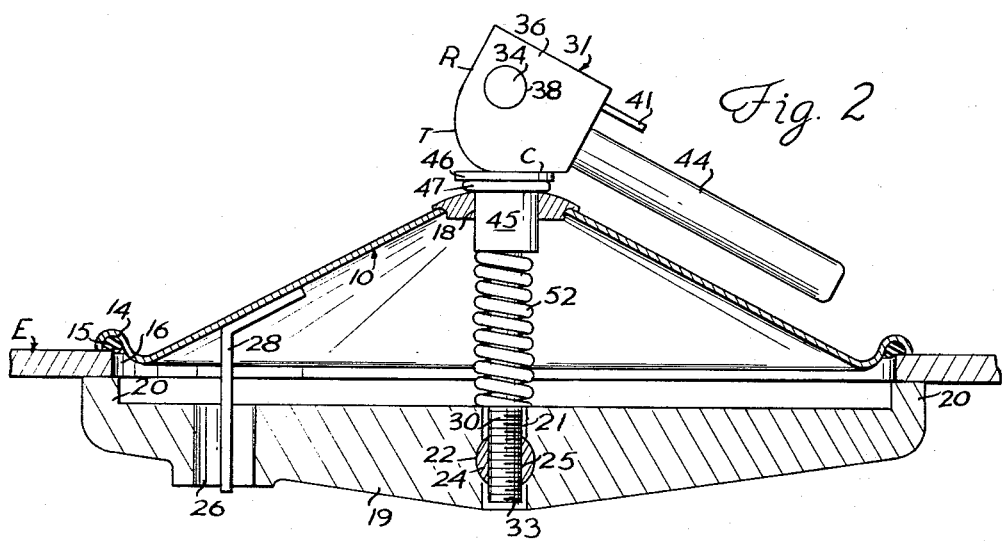

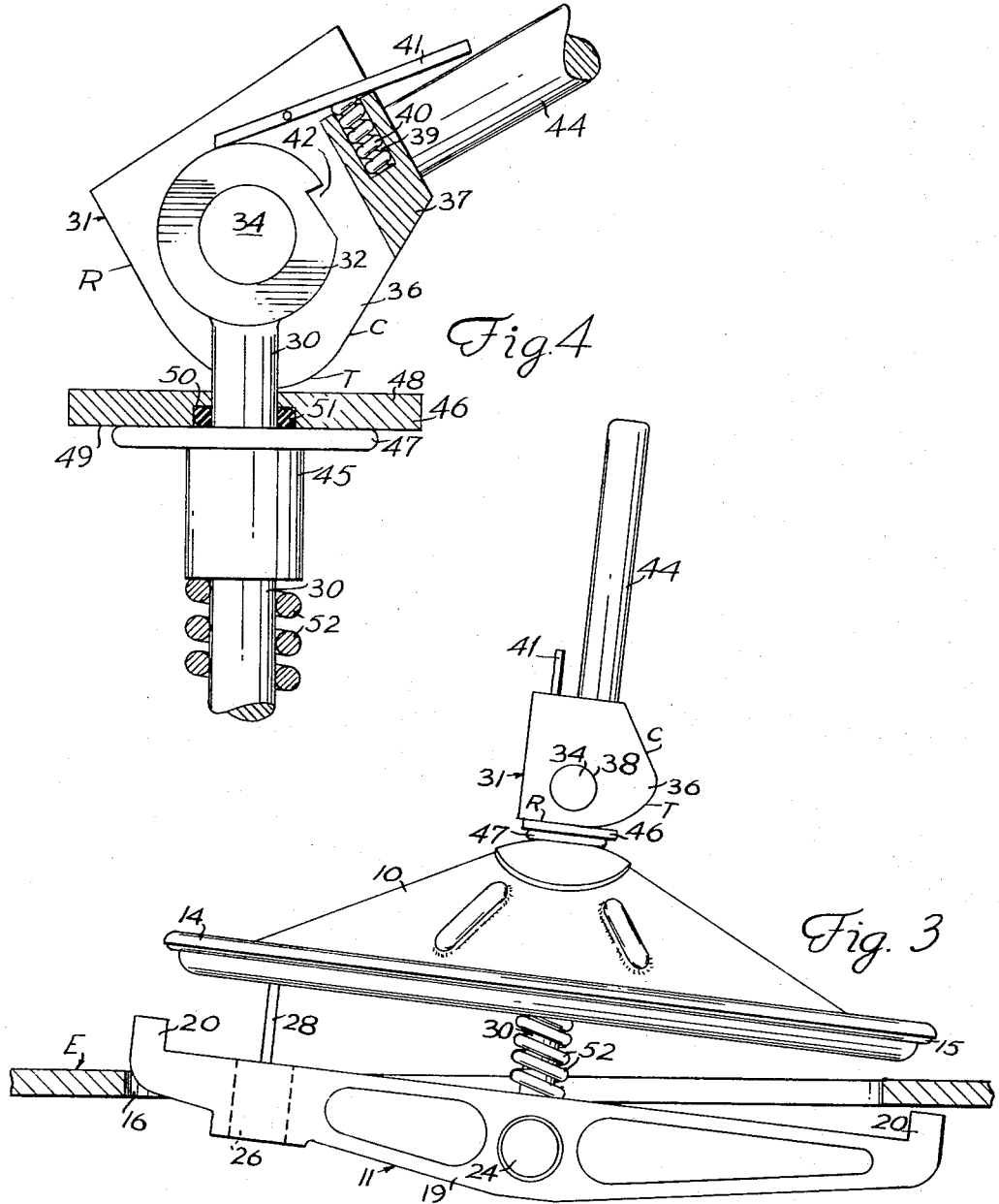

United States Patent Office 3,361,465
Patented Jan. 2, 1968

3,361,465
HAND HOLE COVER DEVICE
William B. Dobbs, 315 Gardner St.,
Chattanooga, Tenn. 37411
Filed Feb. 18, 1966, Ser. No. 528,447
5 Claims. (Cl. 292—257)

ABSTRACT OF THE DISCLOSURE

A device for closing a hand hole in the air box of a diesel engine or other similar opening in a wall. The device includes a cover having a lip which engages an edge of a hole, a crossbar insertable through the hole but of greater length than the diameter of the hole, a connecting pin slideably extending through the cover between the crossbar and a head, a spring urging the cover and crossbar apart, a cam plate pivotable about the head to change the position of the cover relative to the crossbar, and a locking plate pivotable with the cam plate for selectively engaging the head and locking the cam plate in a fixed position relative to the head.

---

This invention relates generally to hand hole covers for diesel and other type engines and more particularly to a quick release hand hole cover for diesel and other type engines.

The crankcase of a large engine using air boxes in its air intake system is provided with openings to the air box or space surrounding the cylinder liners of the engine to permit the inspection and servicing of the engine without complete disassembly thereof. These openings are known as hand holes and are conventionally closed by gasketed covers covering the hand hole and attached to the exterior of the air box by a crossbar having a pivoted bolt therein extending through the cover with a hand wheel on the outer side of the cover effective to clamp the crossbar and cover against the edge of the hand hole. The hand wheel serves to maintain the cover in place during the operation of the engine and yet permit inspection of the interior thereof by unscrewing the hand wheel a predetermined amount in order to allow the cross bar and cover to be removed from the hand hole. When a large number of these hand holes, as is usually the case, must be inspected in an engine, however, a considerable amount of time must be spent in loosening and retightening the hand wheels as the covers are removed before inspection and replaced after inspection.

The present invention overcomes these and other problems and disadvantages associated with prior art hand hole covers in that the cover, while still sufficiently sealing the hand hole, is a quick-release type so that it may be quickly removed from and replaced over the hand hole. The present invention includes a conventional gasketed cover and crossbar but utilizes a cam arrangement connecting the crossbar and hand hole cover so that the crossbar may be quickly and easily released for removal or quickly and easily clamped onto the edge of the hand hole with a single movement of an arm attached to the cam. This results in greatly reducing the amount of time normally involved in tightening and loosening the conventional hand wheels of prior art hand hole covers when inspecting an engine or servicing the same. Moreover, overstressing of the crossbar and cover is prevented since the cam will load the cover and crossbar a predetermined amount each time the cam is rotated to clamp the hand hole cover in place.

These and other features and advantages of the invention will be more clearly understood upon consideration of the following specification and accompanying drawings wherein like characters of reference designate corresponding parts throughout and in which:

FIG. 1 is a top plan view of the invention partially broken away to show the cam lock mechanism therein;

FIG. 2 is a side elevational view of the invention partially broken away to show the interior thereof when the invention is installed in a hand hole;

FIG. 3 is a side elevational view of the invention similar to FIG. 1 but showing the invention being removed from a hand hole; and, FIG. 4 is an enlarged cross-sectional view of the cam lock mechanism of the invention.

These figures and the following specification disclose one specific embodiment of the invention, however, the inventive concept is not limited thereto since it may be embodied in other equivalent forms.

Referring to the drawings, it will be seen that the invention comprises generally a cover 10, a crossbar 11 and a quick release latch mechanism 12 joining the crossbar 11 and cover 10. The cover 10 is a conventional conically shaped hand hole cover made of sheet metal and formed into the conical configuration so that an overturned lip 14 is provided around the outer periphery thereof effective to receive an O-ring 15 therein. The lip 14 is effective to position the O-ring 15 so that it contacts the edge of a hand hole 16 in an engine E when placed in position. The cover 10 has an aperture 18 at the apex thereof to receive the quick release latch assembly 12 therethrough. The crossbar 11 is also of conventional design used with the hand hole cover 10 and is a rectangularly shaped bar 19 having an upturned lip 20 at the outer extending ends thereof effective to contact opposite edges of the hand hole 16 when the bar 11 extends diametrically across the hand hole 16. The bar 11 has a pair of apertures extending through the center thereof, each aperture being perpendicular to the other aperture and designated herein as the apertures 21 and 22. The aperture 21 is effective to receive the quick release latch mechanism 12 therethrough and the aperture 22 is effective to receive a cross pin 24 therethrough. The cross pin 24 has a threaded aperture 25 therethrough effective to threadedly receive the extending end of the quick release latch mechanism 12 therein as will be explained hereinafter. An alignment hole 26 in the crossbar 11 is located just inwardly of one of the lips 20 and a complementary locating pin 28 attached to the cover 10 is effective to extend through the aligning hole 26 so that movement of the bar 11 with respect to the cover 10 is restricted as will be explained hereinafter.

The quick release latch mechanism 12 comprises a connecting pin 30 and a cam release mechanism 31. The connecting pin 30 is threaded at one end 33 thereof effective to be threadedly received in the aperture 25 in the cross pin 24 extending through the aperture 22. Integral with the opposite end of the pin 30 is a cylindrical locking head 32 having a center line perpendicular to the centerline of the connecting pin 30. The head 32 has a bearing pin 34 integral with the head 32 thereof and extending outwardly from either side thereof. The bearing pin 34 is effective to engage the cam arm 35 as will be explained hereinafter.

The cam arm includes a pair of cam plates 36 spaced apart by a spacer 37 and having aligned appropriate apertures 38 therethrough, each being effective to pivotally receive one end of the bearing pin 34 therein. The cam plates 36 are positioned so that when the pin 34 is carried in the apertures 38, the head 32 of the connecting pin 30 is pivotably carried between the cam plates 36.

The spacer 37 has a cylindrical recess 39 therein effective to receive a compression type coil spring 40. A pivoted lock plate 41 is carried between the cam plates 36 and spaced just over the spring 40 so that the inner end of the lock plate 41 is always urged against the head 32 of the connecting pin 30. The outer end of the lock plate 41 extends from between the cam plates 36 so that the operator may depress the outer end of the plate 41 against the tension of the spring 40. This is effective to pivot the inner end of the lock plate 41 away from contact with the head 32. A notch 42 is provided in the peripheral edge of the head 32 which is effective to receive the inner end of lock plate 41 therein when it is urged inwardly by the spring 40 and when the cam plates 36 are in a predetermined position as will be explained later.

A handle 44 is connected to the spacer 37 and extends outwardly therefrom under the lock plate 41 so that the handle 44 may be grasped by an operator and used to pivot the cam plates 36 about the connecting pin 34. The cam plates 36 have a first cam surface C spaced further from the centerline of the apertures 38 through the cam plate 36 than a second cam surface R. The first cam surface C is effective to urge the cross piece and cover 10 together as will be explained hereinafter and a second cam surface R is effective to space the cover 10 from the crossbar 11 sufficiently for the cover assembly to be removed from the hand hole 16. A transfer cam section T joins the first cam surface C and the second cam surface R so that the motion of the cam plates 36 is smooth in operation.

A thrust bearing 45 is fixedly mounted within the aperture 18 of the apex of the conical cover 10. The bearing 45 has a thrust flange 47 at one end and slidably receives the connecting pin 30 therethrough. Encircling the connecting pin 30 between the head 32 and bearing 45 is a thrust washer 46. The thrust washer 46 has a diameter sufficient for the camming surfaces C and R to rest on the upper side 48 thereof while the underside 49 of the washer 46 rests against the upper surface of the thrust flange 47. An annular recess 50 is defined in the thrust washer 46 adjacent the inner periphery thereof and receives an O-ring 51 therein. The O-ring is effective to prevent the passage of air from one side of the cover 10 to the other around the connecting pin 30.

The threaded end of the connecting pin 30 is received in the threaded aperture 25 of the cross pin 24 and a compression type coil spring 52 encircles the connecting pin 30 between the thrust bearing 45 and that surface of the cross bar 11 facing the cover 10, one end of the spring 52 bearing against the thrust bearing 45 and the other end of the spring 52 bearing against the surface of the cross bar 11. This is effective to urge the cover 10 and cross bar 11 apart at all times.

*Operation*

In operation it will be seen that the invention may be placed over a hand hole 16 simply by depressing the outer end of the lock plate 41 so that the inner end thereof clears the notch 42 and then rotating the cam arm 35 so that the handle 44 is approximately co-linear with the centerline of the connecting pin 30. This places the second cam surface R in contact with the top of the thrust washer 46 so that the thrust washer 46 is positioned in its closest position to the head 32 of the connecting pin 30. This is effective to extend the connecting pin 30 through the thrust bearing 45 so that the cover 10 may be spaced from the cross bar 11. The coil spring 52 forces the thrust bearing 45 and therefore the cover 10 is far as it will move toward the head 32 of the connecting pin 30 thereby forcing the cover 10 and cross bar 11 to remain in spaced position as long as the cam lock 35 remains in the aforementioned position. This is effective to allow the side wall of the engine E to the position between the cover 10 and the cross bar 11 and moved therebetween until the entire cross bar 11 can be inserted into the hand hole 16. After this has been done, the invention is then moved until the lip 14 and O-ring 15 overlie the edge of the hand hole 16.

To close the hand hole 16 when the invention is in this position, it is only necessary that the operator rotate the cam arm 35 until the first cam surface C rests against the top 47 of the thrust washer 46. As the operator continues to rotate the cam arm 35, the inner end of the lock plate 41 is spring urged against the head 32 and falls within the notch 42 which is effective to maintain the first cam surface C in contact with the upper top 47 of the thrust washer 46. In this position, the cross bar 11 is in its closest position with respect to the cover 10. This is effective to lock the cover 10 over the hand hole 16 since the lip 14 and O-ring 15 engage one side of wall of the engine E and the upturned lips 20 of the cross bar 11 contact the opposite side of the wall of the engine E so as to lock the invention in place. In order to compensate for different engine wall thicknesses, the threaded end 33 of the connecting pin 30 may be rotated within the threaded aperture 25 in the cross pin 24 so that the distance between the cross bar 11 and cover 10 is adjusted.

The operator removes the invention from the hand hole 16 in the same manner in which he installs the invention in the hand hole 16 by simply reversing the steps of installation. First, he depresses the outer end of the lock plate 41 from the notch 42 and then rotates the cam arm 45 until the handle 44 is approximately co-linear with the centerline of the connecting pin 30, then allowing the wall of the engine E to extend between the cross bar 11 and cover 10 and finally tilting the invention so that one end of the cross bar 11 clears the hand hole 16 and the entire invention is slid out of the hand hole 16 so as to clear it.

It will be obvious to those skilled in the art that many variations may be made in the embodiments herein chosen for the purpose of illustrating the invention without departing from the scope thereof as defined by the appended claims.

What is claimed as invention is:

1. In a device for closing an opening in a wall defined by an edge, a cover having a lip shaped to engage said wall adjacent said edge when said cover is positioned to close said opening, a crossbar having a length between ends greater than a dimension of said opening, a connecting pin attached to said crossbar intermediate said ends and slideably extending through said cover between said crossbar and a head having a notch, a spring positioned on said connecting pin between said cover and said crossbar and urging said cover and said crossbar apart, a cam plate pivotable about said head and having first position in which a first cam surface engages a thrust plate on said cover and a second position in which a second cam surface of larger radial extent engages said thrust plate, and a lock plate rotatable about said head with said cam plate and selectively positionable in said notch when said cam plate is in said second position.

2. The device of claim 1 in which said lock plate is pivotably mounted on said cam plate and is pivoted toward said head by a second spring.

3. The device of claim 1 including an O-ring attached to said cover adjacent said lip.

4. The device of claim 1 including a locating pin extending from said cover into an aligning hole positioned in said crossbar inwardly of one of said ends.

5. The device of claim 1 in which said cover is conical.

References Cited

UNITED STATES PATENTS

| | | | |
|---|---|---|---|
| 966,349 | 8/1910 | McCullah | 292—210 |
| 1,186,038 | 6/1916 | Ramsey et al. | 292—210 X |
| 1,379,162 | 5/1921 | Brown | 292—257 X |
| 1,784,198 | 12/1930 | Persson | 292—259 X |
| 2,793,063 | 5/1957 | Hurley | 292—259 |

RICHARD E. MOORE, *Primary Examiner.*